Patented Feb. 27, 1940

2,191,548

UNITED STATES PATENT OFFICE 2,191,548

POULTRY LICE EXTERMINATOR

Herbert J. Smith, University City, Mo., assignor to Ralston Purina Company, St. Louis, Mo., a corporation of Missouri No Drawing. Application July 30, 1937, Serial No. 156,519

3 Claims. (Cl. 167—34)

My invention relates to an improved insecticide one of the more important uses for which is to destroy insects, such as lice, which infest poultry, its object being to provide a material which may be used by applying it to poultry houses and perches, in which condition it emits toxic gas.

The insecticide most commonly used heretofore on roost poles of poultry houses is a solution of nicotine sulphate in water commonly known as "Black Leaf 40", said solution operating as the result of gradual evolution of nicotine in the form of gas. One disadvantage in connection with the use of this material is the fact that the rate of evolution of nicotine varies within wide limits, depending on the temperature. In cool weather the rate of evolution is too slow to be very effective.

It is the object of my invention to produce a lice exterminator in the form of a "roost paint" which will be as efficient in killing lice as Black Leaf 40 but much less expensive, and will also be more uniform in its operation in that the toxic gas will be evolved at a more regular rate.

My improved insecticide embodies nicotine sulphate and in addition thereto, a weak organic base which reacts with nicotine sulphate to produce free nicotine and which base is preferably also volatile and toxic to poultry lice. In accordance with my preferred formula these toxic elements are in solution in a mixture of glycerine and water.

While proportions may be considerably varied, a suitable formula in accordance with my invention is nicotine sulphate 3%; ethylenediamine 4%; glycerine 67%; and water 26%.

The glycerine imparts viscosity to the mixture whereby it can be readily spread on and will remain on poultry perches, and the glycerine no doubt has a favorable influence on the reaction between the nicotine sulphate and the base when the solution is applied to the perches. The reaction between the nicotine sulphate and the ethylenediamine is reversible and very little nicotine is evolved while the solution remains in the container. After being applied to the roosts, ethylenediamine in vapor form is also emitted with the nicotine and, as above indicated, I prefer to employ more of the base than necessary to react all of the nicotine sulphate. The base is toxic and the insects on the fowl are thus subjected to a gas containing the two toxic elements. My improved insecticide, although containing only approximately 3% of nicotine sulphate, is as efficient in killing lice on poultry as Black Leaf 40 which contains 40% of this element. The cost of my insecticide per fowl is, therefore, very much less than that of other nicotine carrying lice exterminators with which I am familiar.

My improved insecticide has the further great advantages that the rate of evolution of gas is so controlled as to avoid danger of sufficient concentration to kill the fowls. I have found that my insecticide is approximately 100% efficient in killing lice on poultry and that this end is usually accomplished during a single night.

In lieu of using ethylenediamine as the base, I may use certain other organic bases having the similar characteristic of being "weak" and, therefore, not causing too rapid liberation of nicotine. They should preferably also have the characteristic of themselves emitting a gas which is toxic to lice. As examples of other such bases, phenylenediamine and benzylamine may be mentioned.

While very good results are obtained if water is substituted for the glycerine of the above preferred formula, I find that the presence of glycerine secures somewhat better results, probably because a more desirable rate of reaction between the nicotine sulphate and the base is obtained when glycerine is present and, of course, glycerine imparts viscosity, which is desirable in connection with the application of the material to the roosts. Glycerine is hygroscopic, and, since it does not evaporate, it and at least some water remain on the roosts as solvent of the nicotine sulphate and the base throughout the continuance of the reaction between these ingredients.

A further advantage of my improved insecticide is that in addition to being much less expensive than Black Leaf 40, its use involves much less danger to the person applying it than exists in connection with the application of Black Leaf 40 which, under various conditions, may emit nicotine very rapidly.

Having fully described my invention, what I claim as new and desire to secure by Letters Patent of the United States is:

1. An insecticide comprising glycerine, water, nicotine sulphate, and ethylenediamine, the nicotine sulphate constituting approximately 3% and ethylenediamine approximately 4% of said material.

2. An insecticide consisting of the following ingredients in approximately the proportions specified: nicotine sulphate 3%; ethylenediamine 4%; glycerine 67%, and water 26%.

3. An insecticide for use on poultry perches, comprising a solution comprising glycerine and water and containing a relatively small percentage of a nicotine salt and a small percentage of a weak organic base of the class consisting of ethylenediamine, benzylamine, and phenylenediamine.

HERBERT J. SMITH.